United States Patent Office 3,438,988
Patented Apr. 15, 1969

3,438,988
COUMARIN DERIVATIVE
Don Pierre René Lucien Giudicelli, Fontenay-sous-Bois, and Henry Najer, Paris, France, assignors to Les Laboratoires Dausse, Paris, France, a company of France
No Drawing. Filed Feb. 20, 1967, Ser. No. 617,030
Claims priority, application France, Feb. 25, 1966, 51,103; May 24, 1966, 62,676
Int. Cl. C07d 57/36; A61k 27/00
U.S. Cl. 260—253                6 Claims

ABSTRACT OF THE DISCLOSURE

The invention provides the new compound 6,7-dihydroxycoumarin-4-methylsulphonic acid and its salts, which are useful in the treatment of capillary permeability and fragility and for protecting oxidizable metabolites and drugs against bio-oxidation.

This invention relates to substituted coumarins and their preparation.

The present invention provides, as new compounds, 6,7-dihydroxycoumarin-4-methylsulphonic acid of the formula:

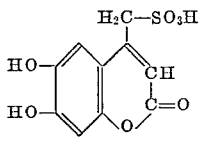

and its salts, especially the salts formed with pharmaceutically and therapeutically acceptable inorganic and organic bases.

According to the invention, 6,7-dihydroxycoumarin-4-methylsulphonic acid is made by heating 6,7-dihydroxy-4-halogenomethylcoumarin with a sulphite, preferably an alkali metal sulphite, in water, in which case an alkali metal salt of the desired acid is obtained. This acid may be liberated from its alkali metal salt by any appropriate process, for example by passing an aqueous solution of the alkali metal salt through a column of an acid ion-exchange resin, such as the resin called "Amberlite IR 120."

The inorganic salts of 6,7-dihydroxycoumarin-4-methylsulphonic acid may be prepared either by reacting the appropriate metal sulphite with a 6,7-dihydroxy-4-halogenomethyl-coumarin under the conditions indicated above, or by reacting 6,7-dihydroxycoumarin-4-methylsulphonic acid with the appropriate metal oxide or hydroxide.

The salts of 6,7-dihydroxycoumarin-4-methylsulphonic acid with organic bases, e.g. papaverine, basic derivatives of theophylline such as aminophylline or 7-tertiaryaminoalkyl theophyllines, vincamine, betaine, or pyridoxine, may be prepared by any known process for the preparation of addition salts, and more particularly either by double decomposition, in a diluent, of salt of 6,7-dihydroxycoumarin-4-methylsulphonic acid, with a salt of the desired base with an inorganic or organic acid, or by direct combination of 6,7-dihydroxycoumarin-4-methylsulphonic acid and the selected base in an appropriate medium.

6,7-dihydroxycoumarin-4-methylsulphonic acid and its salts have therapeutic utility in the treatment of capillary permeability and capillary fragility, and for the treatment of other conditions according to the nature of the inorganic or organic base in said salt; furthermore said substances have therapeutic utility for protecting oxidizable metabolites and drugs against bio-oxidation.

The following examples illustrate the invention.

Example 1

(a) 25.1 g. (0.11 g. mol) of 6,7-dihydroxy-4-chloromethyl-coumarin and 15.3 g. (0.12 g. mol) of sodium sulphite are heated for 5 hours under reflux in 250 ml. of water, under a stream of nitrogen and with stirring. The solution is filtered through animal or vegetable charcoal, the filtrate is stored in ice overnight, and the compound which has precipitated is suction-filtered, washed with water, and dried in vacuo over phosphorus pentoxide. In this way 19.9 g. (61.5% yield) of sodium 6,7-dihydroxycoumarin-4-methylsulphonate are obtained. After recrystallisation from water, it forms light yellow crystals, soluble in water to the extent of about 2.5% by weight but insoluble in the majority of organic solvents. Its 1% solution in water has a pH of 4.6.

Analysis.—Calcd. for $C_{10}H_7O_7SNa$: C=40.82 percent; H=2.38 percent; S=10.88 percent. Found: C=41.00 percent; H=2.20 percent; S=10.92 percent.

(b) 19.9 g. (0.0677 g. mol) of sodium 6,7-dihydroxycoumarin-4-methyl-sulphonate are dissolved in 1.5 litres of water and this solution is passed through a column of an acid ion-exchange resin, for example Amberlite IR 120. The water is evaporated from the eluate on a water bath in vacuo, and the residue is dried in vacuo over phosphorus pentoxide. 17.5 g. (81.5% yield) of 6,7-dihydroxycoumarin-4-methylsulphonic acid are obtained and this, when recrystallised from 50 cm.³ of 3 N hydrochloric acid, forms yellow hydrated crystals which are very soluble in water and alcohols. This compound may be dehydrated for 5 hours at 140° C. at 20 mm. Hg over phosphorus pentoxide. The compound then has an ill-defined melting point of about 310° C. with decomposition.

Analysis.—Calcd. for $C_{10}H_8O_7S$: C=44.12 percent; H=3.06 percent; S=11.76 percent. Found: C=43.89 percent; H=3.11 percent; S=11.58 percent.

Example 2

12.2 g. (0.0415 g. mol) of sodium 6,7-(dihydroxycoumarin - 4 - methylsulphonate are dissolved in 640 cm.³ of water and 15.6 g. (0.0415 g. mol) of papaverine hydrochloride are added. The oil which precipitates crystallises after several hours . The mixture is kept in cie for several days, and the precipitate is suction-filtered, washed with water, and dried in vacuo over phosphorus pentoxide. 21.1 g. (81.5% yield) of papaverine 6,7-dihydroxycoumarin-4-methylsulphonate are obtained. After recrystallisation from 150 cm.³ of 50% ethanol, it forms yellow crystals containing 0.5 molecule of water of hydration. On a Maquenne block, melting is observed at about 180° C.

Analysis.—Calcd. for $C_{30}H_{29}NO_{11}S \cdot \frac{1}{2}H_2O$: C=58.05 percent; H=4.87 percent; S=5.16 percent; $H_2O$=1.45 percent. Found: C=57.98 percent; H=4.85 percent; S=5.06 percent; $H_2O$ (by the Fisher method)=1.66.

The preparation of salts of 6,7-dihydroxycoumarin-4-methylsulphonic acid is illustrated in the following Examples.

Example 3

52.8 g. (⅙ g. mol) of 6,7-dihydroxycoumarin-4-methylsulphonic acid are dissolved in 400 cm.³ of water. 76.1 g. (⅙ g. mol) of aminophylline previously dissolved in 400 cm.³ of water are added to this solution. The mixture is left in the ice-chest overnight, and the resulting salt is suction-filtered, washed with water and dried at 50° C. in vacuo over phosphorus pentoxide, 116.9 g. (98.5% yield) of aminophylline 6,7-dihydroxycoumarin-4-methylsulphonate are obtained in the form of a monohydrate which is recrystallised from 800 cm.³ of water. 104.8 g. (88.5% yield) of a yellow crystalline compound are recovered, which decomposes at about 260° C.

*Analysis.*—Calcd. for $C_{26}H_{34}O_{12} \cdot H_2O$: C=43.80 percent; H=4.83. Found: C=44.00 percent; H=4.82 percent.

Example 4

49 g. (1/6 g. mol) of sodium 6,7-dihydroxycoumarin-4-methylsulphonate and 76.1 g. (1/6 g. mol) of aminophylline are heated in 800 cm.³ of water to which 167 cm.³ of N hydrochloric acid have been added. Heating is continued until the materials have completely dissolved. The solution is filtered, and the filtrate is rapidly cooled and stored in ice for several hours. The precipitate is suction-filtered, washed first with water and then with acetone, and finally dried at 70° C. in vacuo over phosphorus pentoxide. 104.6 g. (89% yield) of aminophylline 6,7-dihydroxycoumarin - 4 - methylsulphonate monohydrate are obtained. It is recrystallised from 800 cm.³ of water, and 96 g. (81% yield) of a yellow crystalline compound are obtained.

*Analysis.*—Calcd. for $C_{26}H_{34}O_{12}SN_{10} \cdot H_2O$: C, 43.80%; H, 4.83%; S, 4.51%. Found: C, 43.55%; H, 4.73%; S, 4.58%.

Example 5

2.95 g. (0.01 g. mol) of sodium 6,7-dihydroxycoumarin-4-methylsulphonate are dissolved in 150 cm.³ of water and 3.9 g. (0.01 g. mol) of vincamine hydrochloride are added. The solution is cooled in ice, and the precipitate is suction-filtered, washed with water and dried in vacuo over phosphorus pentoxide. 5.6 g. (89% yield) of vincamine 6,7-dihydroxycoumarin-4-methylsulphonate are obtained. After recrystallisation from aqueous alcohol it forms a crystalline compound melting in a pasty manner at about 220° C.

*Analysis.*—Calcd. for $C_{31}H_{34}O_{10}SN_2$: C, 59.42%; H, 5.43%; N, 4.49%. Found: C, 59.31%; H, 5.68%; N, 4.37%.

Example 6

1.7 g. (0.01 g. mol) of pyridoxine base in 30 cm.³ of ethanol are added to a solution of 3.2 g. (0.1 g. mol) of 6,7-dihydroxycoumarin-4-methylsulphonic acid in 30 cm.³ of ethanol. The mixture is brought to the boil and then kept in ice overnight. The resulting precipitate is suction-filtered, washed with alcohol and dried in vacuo over phosphorus pentoxide. 4.1 g. (93% yield) of pyridoxine 6,7-dihydroxycoumarin-4-methylsulphonate are thus obtained. After recrystallisation from water, it melts at 230° C. (pasty melting).

*Analysis.*—Calcd. for $C_{18}H_{19}NO_{10}S$: C, 48.97%; H, 4.31%. Found: C, 48.61%; H, 4.27%.

Example 7

147.1 g. (0.5 g. mol) of sodium 6,7-dihydroxycoumarin-4-methylsulphonate are added to a solution of 102.5 g. (0.5 g. mol) of pyridoxine hydrochloride in 2 litres of water. The mixture is raised to the boil, filtered and the filtrate left at ambient temperature with stirring. The resulting precipitate is suction-filtered, washed with water, and dried at 60° C. in vacuo over phosphorus pentoxide. In this way 194 g. (93% yield) of pyridoxine 6,7-dihydroxycoumarin - 4 - methylsulphonate are obtained. After recrystallisation from water, it forms yellow crystals containing 1.5 moles of water of crystallisation. A sample of this hydrated product, when heated for 15 hours at 120° C. in vacuo over phosphorus pentoxide, loses its water of crystallisation and then has a melting point at 230° C.

*Analysis.*—Calcd. for $C_{18}H_{19}NO_{10}S$: C, 48.97%; H, 4.31%. Found: C, 48.90%; H, 4.33%.

Example 8

14.2 g. (0.105 g. mol) of betaine hydrate, previously dissolved in 30 cm.³ of water, are added to a solution of 33.2 g. (0.0105 g. mol) of 6,7 - dihydroxycoumarin - 4 - methylsulphonicacid. The water is evaporated on a water bath in vacuo and the residue is crystallised from 330 cm.³ of 60% aqueous ethanol. 33.2 g. (81% yield) of betaine 6,7 - dihydroxycoumarine-4-methylsulphonate are obtained as a yellow compound which is soluble in water and melts at 270–275° C.

*Analysis.*—Calcd. for $C_{15}H_{19}O_9SN$: C, 46.26%; H, 4.92%; N, 3.59%. Found: C, 46.37%; H, 4.93%; N, 3.32%.

6,7 - dihydroxycoumarin-4-methylsulphonic acid, when administered as its sodium salt, is of very low toxicity. When administered orally, it does not cause the death of fasting mice at a dose of 8 g./kg. (using a batch of 10 animals). When administered orally to rabbits at a dose of 25 mg./kg. it causes a strong diminution of the capillary permeability (43±8% as evaluated by the method of Vincent (C.R. Soc. Biol., 1959, 153, p. 1825). This variation of capillary permeability is very significant (p.=0.001) compared to that observed with control animals.

The sodium salt of 6,7 - dihydroxycoumarin-4-methylsulphonic acid may be used in therapy to combat disturbances of capillary permeability and capillary fragility, either by oral administration or by parenteral administration, preferably combined with ascorbic acid.

Further it reinforces and prolongs the effect of various phenolic substances used in medicaments, by protecting them against oxidation in biological media.

The salts of 6,7-dihydroxycoumarin-4-methylsulphonic acid with various organic bases are useful for therapeutic purposes. Thus the papaverine salt, has an effect on capillary permeability, when administered orally or intermuscularly, which is twice as great as that of the amount of acid which it contains, and which furthermore shows an inhibitory effect on vascular smooth muscle fibre which is equal to that of papaverine hydrochloride on a molar basis. The LD50 (on oral administration in mice) of papaverine 6,7-dihydroxycoumarin-4-methylsulphonate is 840 mg./kg. (95% confidence limits: 579–1218 mg./kg.). Expressed as papaverine base, this corresponds to 470 (317–666) mg./kg. By way of comparison, the LD50 of papaverine hydrochloride (also administered orally in mice) is 360 (276–468) mg./kg., corresponding to 325 (249–422) mg./kg. of papaverine base. This latter value does not differ significantly from the 470 mg./kg. calculated from the LD50 of papaverine 6,7 - dihydroxycoumarin - 4 - methylsulphonate. Thus converting papaverine to a salt with 6,7-dihydroxycoumarin-4-methylsulphonic acid does not materially change the toxicity of this alkaloid.

The aminophylline salt of 6,7-dihydroxy-4-methylsulphonic acid has an LD50, expressed as aminophylline, which is administered orally or intraperitoneally to mice higher than that of aminophylline, showing that converting aminophylline into a salt with 6,7-dihydroxycoumarin-4-methylsulphonic acid lessens the toxicity of this base. Quantitative data are given in the table below.

| | Oral administration LD50 (mg./kg.) | Intraperitoneal administration LD50 (mg./kg.) |
|---|---|---|
| Aminophylline salt | 600 (545–660) | 420 (368–479) |
| Aminophylline in the salt | ¹ 354 (321–389) | ¹ 248 (218–283) |
| Free aminophylline | ¹ 280 (254–308) | ¹ 180 (150–216) |

¹ The two values which are preceded by this sign differ significantly from one another.

This salt exerts the characteristic effets of aminophylline and theophylline on the central nervous system, the heart, the kidney, and on smooth muscle. Like the acid from which it is derived, it has a powerful action on the capillary permeability after oral or intramuscular administration.

The vincamine salt is equally useful for therapeutic purposes, notably because of its property of dilating the cerebral and coronary vessels, its hypotensive effects, and its inhibiting effects on capillary permeability.

Generally, the compounds of this invention reduce the capillary permeability and the capillary fragility and increase the duration of effect of monophenolic or polyphenolic drugs administered with them, by retarding their oxidation. These characteristic properties are combined with those of the inorganic or organic bases which may be combined (as a salt) with 6,7-dihydroxycoumarin-4-methylsulphonic acid. The acid and its salts also act as reducing agents which oppose the bio-oxidation of ascorbic acid, thus favouring the utilisation of the latter and prolonging its vitamin and pharmacodynamic effects.

The new compounds may be administered orally, parenterally or rectally, either by themselves or in combination with other drugs which are therapeutically and pharmaceutically compatible with them. In each particular case an appropriate excipient for the selected method of administration is used.

The invention accordingly includes within its scope pharmaceutical compositions comprising one or more of the new compounds of the invention in association with a pharmaceutically and therapeutically compatible carrier or coating. Such compositions may be made up using methods conventional in the art.

Examples of daily doses and dosage units for the new compounds are as follows:

| Salt with— | Daily dose (g.) | Unit dosage (g.) | Form |
|---|---|---|---|
| Sodium | 0.03–1.20 | 0.01–0.20 | Tablets. |
| Papaverine | 0.06–1.20 | 0.03–0.20 | Do. |
| Aminophylline | 0.10–1.20 | 0.05–0.30 | Do. |
|  | 0.20–1.20 | 0.20–0.60 | Suppositories. |
| Vincamine | 0.015–0.150 | 0.005–0.025 | Tablets. |
| Pyridoxine | 0.10–2 | 0.10–0.50 | Do. |
| Betaine | 0.50–4 | 0.25–0.50 | Do. |

We claim:
1. 6,7-dihydroxycoumarin-4-methylsulphonic acid.
2. The papaverine salt of 6,7-dihydroxycoumarin-4-methylsulphonic acid.
3. The aminophylline salt of 6,7-dihydroxycoumarin-4-methylsulphonic acid.
4. The vincamine salt of 6,7-dihydroxycoumarin-4-methylsulphonic acid.
5. The betaine salt of 6,7-dihydroxycoumarin-4-methylsulphonic acid.
6. The sodium salt of 6,7-dihydroxycoumarin-4-methylsulphonic acid.

References Cited
UNITED STATES PATENTS 2,600,375   6/1952   Ackermann _____ 260—343.2

ALEX MAZEL, *Primary Examiner.*

A. M. TIGHE, *Assistant Examiner.*

U.S. Cl. X.R.

260—343.2, 293.4, 286, 297.5; 424—253, 260, 263, 267, 281